United States Patent Office 2,869,241
Patented Jan. 20, 1959

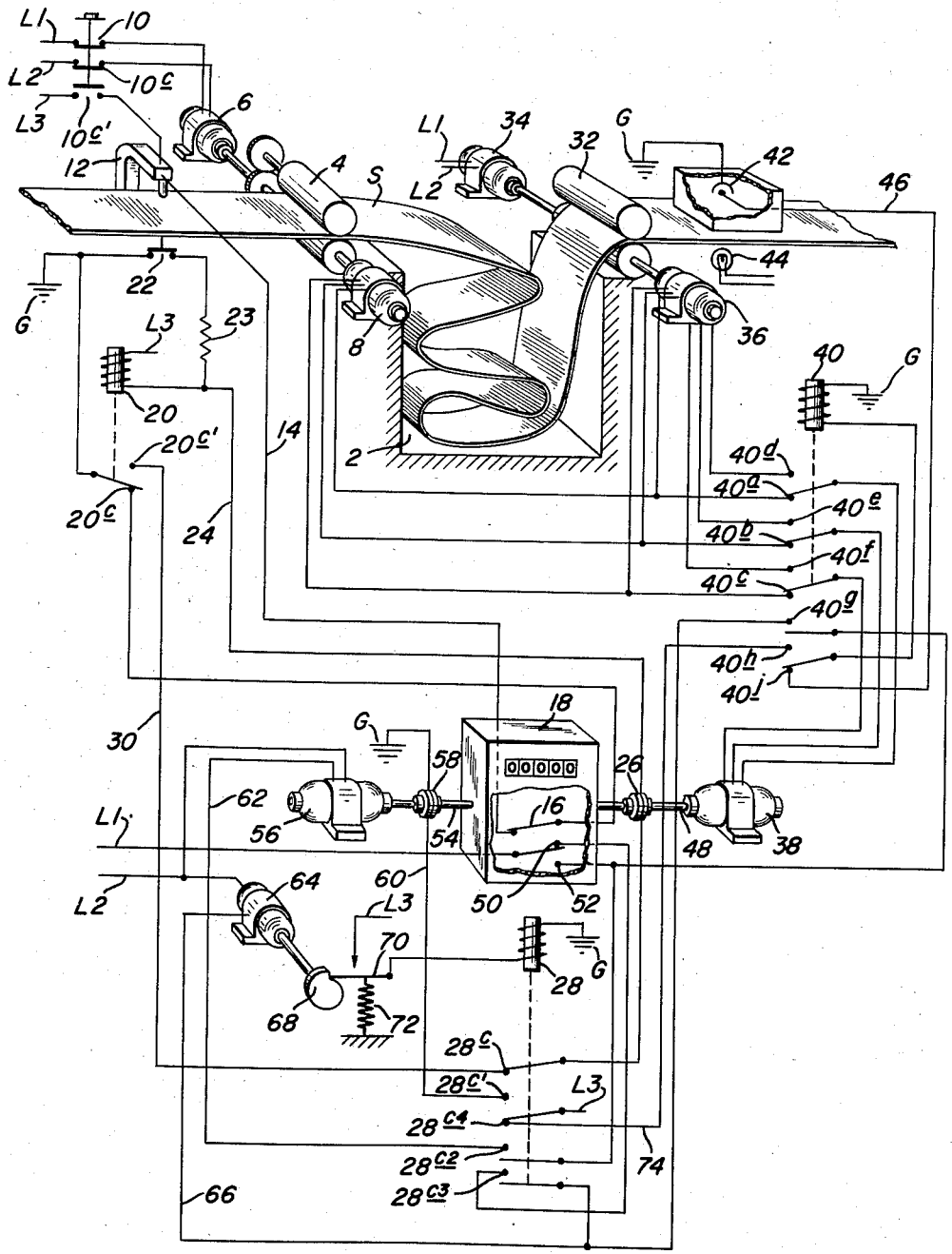

2,869,241

APPARATUS FOR MEASURING THE LENGTH OF STRIP

Frank A. Witt, Pittsburgh, Pa., assignor to United States Steel Corporation, a corporation of New Jersey Application April 17, 1956, Serial No. 578,652

7 Claims. (Cl. 33—136)

This invention relates to apparatus for measuring the length of strip and more particularly for measuring the length of steel strip in looping pits on strip processing lines. The length of strip in the loop is often controlled manually by the operator. If too much strip is in the looper pit creases and folds may occur therein. If there should be too little strip in the pit to allow time for welding coils of strip end to end, the entire line must be stopped. The present system for measuring or controlling length of strip in the looper pit requires the use of numerous rolls, the axis of which are free to move perpendicular to the pass line of the strip. The rolls are usually staggered on opposite sides of the strip and as they are forced against the strip loops are formed against each roll. The farther these rolls are moved apart the greater the length of strip in the loop. The length of strip in each loop is approximately equal to twice the distance from the pass line to the axis of the roll so that by measuring the distance from the pass line to each roll the length of strip in the looping tower can be determined. This system is costly to build and to maintain. Another system in use consists of two selsyn generators, a differential selsyn motor and a counter, one of the generators being driven by a pair of pinch rolls on the entry side of the pit and the other generator being driven by another set of pinch rolls located at the exit side of the pit. These generators drive a differential selsyn motor. The differential motor in turn drives a mechanical reversible counter. Variable speed drives are used so that they will indicate the number of feet of strip passing the pinch rolls. Any errors in calibration as well as slippage between the pinch rolls and strip will be accumulative. For example, if the input generator is over-calibrated by 1% and the output generator under-calibrated by 1%, the counter will give a cumulative 2% error.

It is therefore an object of my invention to provide apparatus for measuring the length of strip which can be readily recalibrated.

Another object is to provide such an apparatus wherein the errors in measurement will not continue to accumulate.

These and other objects will be more apparent after referring to the following specification and attached drawings, in which:

The single figure is a schematic drawing of the apparatus of my invention.

Referring more particularly to the drawings, reference numeral 2 indicates a looper pit for strip S being processed. A pair of pinch rolls 4 driven by a motor 6 feed the strip S to the pit 2. A selsyn generator 8 is connected to one of the rolls 4 so that it is driven at a speed proportional to the speed of the strip passing thereover. The motor 6 is driven from an A. C. power source L1—L2 and power to the motor is controlled by means of a switch 10 having contacts 10C and 10C'. A solenoid punch 12 is provided adjacent the rolls 4 and is operated by a D. C. power source from line L3 through contact 10C'. A power line 14 leads from punch 12 and is connected to ground G through contact 16 of a reversible resettable counter 18 and contact 20C which is controlled by relay coil 20. A switch 22 is connected with punch 12 so that it will close when the punch operates. Closing of switch 22 completes a circuit to coil 20 from line L3 through resistor 23 to ground G. When energized relay coil 20 will open the circuit through contact 20C and close a circuit through contact 20C'. Opening of the circuit through contact 20C stops operation of punch 12. Switch 22 will open when punch 12 completes its operation but in the meantime a circuit has been completed through relay coil 20, line 24, magnetic clutch 26, contact 28C, line 30 and contact 20C' to ground, thus holding relay coil 20 energized.

A pair of pinch rolls 32 are located on the exit side of the looper pit 2 and are driven by motor 34 which is energized from power source L1—L2. A differential selsyn generator 36 is connected to be driven from one of the pinch rolls 32 at a speed proportional to the speed of the strip S. The output of selsyn generator 8 may be connected to differential selsyn generator 36 or alternatively to selsyn receiver 38 through contacts 40a, 40b and 40c. Contacts 40a, 40b and 40c are normally closed but are open when relay coil 40 is energized. Relay coil 40 also has normally open contacts 40d, 40e, 40f, 40g and 40h and normally closed contact 40j. A photocell 42 and electric light 44 are located on opposite sides of the strip S adjacent the rolls 32. The photocell 42 is energized by light from light source 44. The relay coil 40 is energized by current from photocell 42 through lead 46 and normally closed contact 40j. Shaft 48 of selsyn receiver 38 is connected through magnetic clutch 26 to the counter 18. Counter 18 is any standard type and may be of the No. 5-R-7-Q-R type manufactured by the Durant Manufacturing Company and shown in Section 45, issue E, of their Productimeters Catalog. In addition to contact 16 which is closed when the counter is on zero the counter is provided with contacts 50 and 52, contact 50 being closed and contact 52 open when the counter reads zero. When the counter leaves the zero position contacts 16 and 50 will open and contact 52 will close. Reset shaft 54 of counter 18 is connected to motor 56 through magnetic clutch 58. Magnetic clutch 58 is energized from line L3 through contact 28C' and line 60 to ground G. Motor 56 is energized from lines L1 and L2 through line 62, contact 28C2 and contact 52. A timer motor 64 is energized from lines L1 and L2 through line 66, contact 40G and contact 52 or in the alternative from line 66 through contact 28C3 and contact 50. Timer motor 64 drives a cam 68 which operates switch 70 which is held against the cam 68 by means of spring 72. Relay coil 28 is energized from line L3 through switch 70. Relay coil 40 is also energized from line L3 through contact 28C4, line 74 and contact 40h.

The operation of my device is as follows:

Assuming that the parts are in the positions shown in the drawing, switch 10 is depressed to open contacts 10C and close contact 10C'. This will stop motor 6 and thus stop the feed of the strip S to the pit 2. Closing of contact 10C' energizes the solenoid of punch 12 to put a hole in the strip S. Operation of punch 12 also closes switch 22, thus energizing relay coil 20 to open contact 20C and close contact 20C'. Resistor 23 is used to match the load of clutch 26 so as to prevent a short circuit. Closing of contact 20C' completes the holding circuit to relay coil 20 through line 24, magnetic clutch 26, contact 28C, line 30 and contact 20C'. This circuit also energizes clutch 26 so that selsyn receiver 38 is connected to drive counter 18. Opening of contact 20C deenergizes the solenoid (not shown) of punch 12. As soon as switch 10 is released contacts 10C will close energizing motor 6 and contact 10C' will open. Motor 6 rotates rolls 4, thus moving strip S into the pit 2. Selsyn generator 8 will also start in operation and generate electrical impulses proportional to the length of strip passing the pinch rolls 4. This impulse will pass through contacts 40a, 40b and 40c to selsyn receiver 38 and rotate it so that the length of strip will be indicated on counter 18. As soon as the counter leaves the zero position shown contacts 16 and 50 will be opened and contact 52 closed by operation of the mechanical counting system of the counter. The system continues to operate in this manner until the hole in strip S caused by the punch 12 passes between the photocell 42 and light 44. When this occurs relay coil 40 is energized, thus closing its normally open contacts and opening its normally closed contacts. Closing of contact 40h completes the holding circuit to coil 40 from power source L3 through contact 28C4 and line 74. Energization of coil 40 disconnects selsyn generator 8 from selsyn receiver 38 and connects the output of differential selsyn generator 36 to selsyn receiver 38. The electrical output of differential selsyn generator 36 is proportional to the difference between the electrical impulse created by the mechanical rotation of its shaft by the pinch rolls 32 and the electrical impulse from generator 8. Therefore, the electrical output of the differential selsyn 36 is proportional to the difference between the amount of strip entering and leaving the pit 2. Counter 18 will continue to indicate the amount of strip S in the pit since it will add on additional strip put into the pit and subtract the strip taken out. Energization of relay coil 40 also completes a circuit to the timer motor 64 from line L2 through line 66, contact 40g and contact 52 to line L1. Energization of motor 64 starts the timer cam 68 in rotation. After a predetermined time interval cam 68 will operate to close switch 70. Closing of switch 70 completes the circuit to energize relay coil 28. Energization of relay coil 28 completes a circuit from line L3 through contact 28C' and clutch 58 to ground G, thus connecting reset motor 56 to counter 18. Energization of coil 28 also completes a circuit to motor 56 from line L2 through line 62, contact 28C2 and contact 52 to line L1. At the same time the holding circuit to relay coil 40 is opened by energization of coil 28. The opening of contact 28C deenergizes magnetic clutch 26 stopping counter 18. When the counter 18 is reset to zero contact 52 will open stopping reset motor 56 and contact 50 will close so that power is supplied to timer motor 64 through contact 28C3. Timer motor 64 continues to rotate until the cam 68 opens switch 70 to deenergize relay 28, thus opening contact 28C3 and deenergizing motor 64. Deenergization of relay 28 also opens contact 28C' to deenergize magnetic clutch 58. It will be seen that the system is now back to its original position shown in the drawing. Thus all errors are wiped out and calibration takes place while the counter is indicating the amount of strip going into the pit 2. Instead of a punch other means may be provided to mark the strip and start the system in operation. For example, a magnetic mark may be applied to the strip in which case magnetic mark detectors would be substituted for the photocell arrangement shown. If desired two indicating systems could be used in parallel so that one could be used to indicate the length of strip in the pit while the other is being reset. Likewise other means could be used for obtaining an impulse proportional to strip length.

While one embodiment of my invention has been shown and described it will be apparent that other adaptations and modifications may be made without departing from the scope of the following claims.

I claim:

1. Apparatus for measuring the length of moving strip between two spaced points comprising means for measuring the length of strip passing the first of said points, means for measuring the difference between the amount of strip passing the second point and the amount passing the first point, means adjacent the first point for applying a mark to the strip, means starting the first measuring means in operation when said mark is being applied, means adjacent the second point for detecting the mark on the strip as it passes thereby, means controlled by said detecting means for starting the second named measuring means in operation when said mark is detected, and means for periodically stopping operation of said measuring means for recalibration of said measuring apparatus.

2. Apparatus for measuring the length of moving strip between two spaced points comprising first measuring means for obtaining an electrical impulse proportional to the length of strip passing the first of said points, second measuring means for obtaining an electrical impulse proportional to the difference in length of strip passing the second of said points and the length passing the first point, a receiver, means adjacent the first point for applying a mark to the strip, means for applying the impulse from said first means to said receiver when said mark is being applied, means adjacent the second point for detecting the mark on the strip as it passes thereby, means controlled by said detecting means for discontinuing the direct application of the impulse from said first means to said receiver and applying the impulse from said second means to said receiver when said mark is detected, and means for periodically stopping operation of said measuring means for recalibration of said measuring apparatus.

3. Apparatus for measuring the length of moving strip between two spaced points comprising first means for obtaining an electrical impulse proportional to the length of strip passing the first of said points, second means for obtaining an electrical impulse proportional to the difference in length of strip passing the second of said points and the length passing the first point, a reset counter, means adjacent the first point for applying a mark to the strip, means for applying the impulse from said first means to said counter to start the same when said mark is being applied, means adjacent the second point for detecting the mark on the strip as it passes thereby, means controlled by said detecting means for discontinuing the direct application of the impulse from said first means to said counter and applying the impulse from said second means to said counter when said mark is detected, and means for periodically stopping said counter and resetting it to zero.

4. Apparatus for measuring the length of moving strip between two spaced points comprising first measuring means for obtaining an electrical impulse proportional to the length of strip passing the first of said points, second measuring means for obtaining an electrical impulse proportional to the length of strip passing the second of said points, a receiver, means adjacent the first point for applying a mark to the strip, means for applying the impulse from said first means to said receiver when said mark is being applied, means adjacent the second point for detecting the mark on the strip as it passes thereby, means controlled by said detecting means for applying the difference between said impulses to said receiver when said mark is detected, and means for periodically stopping operation of said measuring means for recalibration of said measuring apparatus.

5. Apparatus for measuring the length of moving strip between two spaced points comprising means for obtaining an electrical impulse proportional to the length of strip passing the first of said points, means for obtaining an electrical impulse proportional to the length of strip passing the second of said points, a reset counter, means adjacent the first point for applying a mark to the strip, means for applying the impulse from the first named means to said counter to start the same when said mark is being applied, means adjacent the second point for detecting the mark on the strip at it passes thereby, means controlled by said detecting means for applying the difference between said impulses to said counter when said mark is detected, and means for periodically stopping said counter and resetting it to zero.

6. Apparatus for measuring the length of moving strip between two spaced points comprising a first generator connected to be driven at a speed proportional to the speed of the strip passing the first of said points to obtain a first electrical impulse, a second generator connected to be driven at a speed proportional to the speed of the strip passing the second of said points to obtain a second electrical impulse, an electrical connection between said generators, a receiver, an electrical connection whereby the impulse from said first generator is impressed on said second generator to obtain the difference between said first and second impulses, an electrical connection between said first generator and said receiver, a counter connected to said receiver, means adjacent the first point for applying a mark to the strip, means connecting the first generator to said receiver when said mark is being applied, means adjacent the second point for detecting the mark on the strip as it passes thereby, means controlled by said detecting means for disconnecting said first generator from said receiver and connecting said second generator to said receiver when said mark is detected.

7. Apparatus for measuring the length of moving strip between two spaced points according to claim 6 including a timer, means controlled by the mark detecting means for starting said timer in operation, and means controlled by said timer for resetting said counter to zero after a predetermined interval.

References Cited in the file of this patent

UNITED STATES PATENTS

| 2,306,750 | Rendel | Dec. 29, 1942 |
| 2,332,573 | Hibschmann et al. | Oct. 26, 1943 |
| 2,603,688 | Cole et al. | July 15, 1952 |